SCR CONVERSION SYSTEM WITH MAGNETIC AMPLIFIER GATE CONTROL

Filed July 30, 1958 2 Sheets-Sheet 1

INVENTOR
ARTHUR Z. GUTTERMAN
BY Mitchell & Bechert
ATTORNEY

May 28, 1968 A. Z. GUTTERMAN 3,386,026

SCR CONVERSION SYSTEM WITH MAGNETIC AMPLIFIER GATE CONTROL

Filed July 30, 1958 2 Sheets-Sheet 2

INVENTOR
ARTHUR Z. GUTTERMAN
BY Mitchell & Bechert
ATTORNEY

United States Patent Office 3,386,026
Patented May 28, 1968

3,386,026

SCR CONVERSION SYSTEM WITH MAGNETIC AMPLIFIER GATE CONTROL

Arthur Z. Gutterman, Stamford, Conn., assignor to Fairfield Engineering Corporation, Springdale, Conn.

Filed July 30, 1958, Ser. No. 751,981
7 Claims. (Cl. 321—8)

This invention relates to a power switching circuit and more particularly to a circuit capable of controlling relatively high power by means of a low power control element.

More specifically, this invention relates to a magnetic amplifier for controlling a solid state gate which admits or blocks power to a load.

Magnetic amplifiers have long been used for the control of power. They are characterized by high efficiency, stability, uniformity, reliability, and flexibility. They are also capable of handling large amounts of power; however, they exhibit a weight factor which is a decided disadvantage.

Recently, a silicon rectifier having thre p-n junctions has been introduced which is suitable for use in power control and power switching applications. The characteristics of this rectifier, however, are subject to wide variations because practical processes have not yet been evolved for the production of units having the same, or approximately the same, characteristics. In fact, the control current required to "switch-on" the rectifier may vary by as much as 20:1 from one unit to another.

It is an object of this invention to provide power control means, having all of the major advantages of a magnetic amplifier but with vastly reduced weight.

It is a further object of this invention to provide a circuit comprising a miniaturized, solid state switching element, for use in power control and power switching applications, under the control of a magnetic amplifier.

It is still a further object of this invention to provide an alternating-current bridge for the selective application of full-wave power into a load.

In accordance with an aspect of the invention, there is provided a power control circuit comprising a normally blocked rectifier having input, output and control electrodes. The rectifier is rendered conducting by the application of current of given amplitude and direction to the control electrode. A load is connected to the output electrode of the rectifier, and a power source for feeding the load is coupled across the rectifier and the load. A current source, in the form of a magnetic amplifier, is coupled to the control electrode and is capable of selectively producing currents of amplitude exceeding the required amplitude for causing the rectifier to conduct. The rectifier, therefore, under control of the magnetic amplifier serves to control selectively the application of power to the load.

Accordingly, large amounts of power are controlled by a relatively small magnetic amplifier, operating in conjunction with a silicon controlled rectifier. The flexibility, stability, uniformity, and reliability of a magnetic amplfier is retained by virtue of the magnetic amplifier control, while large power handling capability is achieved with minimum weight by virtue of the silicon controlled rectifier. Furthermore, it is to be noted that the high efficiency of a magnetic amplifier (which is essentially a nondissipative device) is retained by virtue of the fact that the silicon controlled rectifiers are at all times either a virtually closed or a virtually open circuit and, therefore, do not dissipate power.

The above-mentioned and other features and objects of this invention and the manner of attaining them will become more apparent and the invention itself will be best understood by reference to the following description of embodiments of the invention taken in conjunction with the accompanying drawing, wherein.

One of the most significant advantages of this invention resides in its simplicity. The invention actually comprises only a few basic "building blocks" of miniaturized proportions for power control applications. For example, the circuits illustrated in FIGURES 3, 4 and 5, excluding the load, may weigh less than one pound per kilowatt of controlled power. In most power applications, where magnetic amplifiers are employed for controlling power, the functionally equivalent circuit weighs approximately 100 times more than the circuit of this invention. Further, the circuit illustrated in FIGURE 3, for example, may occupy a volume less than a three-inch cube, whereas a functionally comparable magnetic amplifier control occupies approximately 1500 cubic inches. It is also to be realized that this invention has many diverse applications in power control and power switching. For example, it may be utilized in controlling power in industrial servo systems, heating and welding equipment, variable lighting, motors, circuit breakers, etc.

Figure 1:
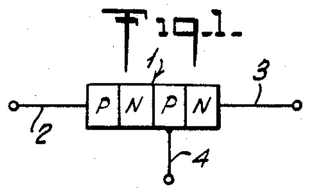
FIGURE 1 is a diagrammatic illustration of the controlled rectifier serving as a switch in the application of power to a load.
Figure 2:
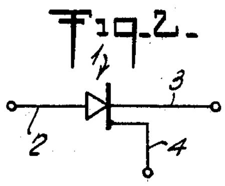
FIGURE 2 is the equivalent symbolic diagram for the rectifier shown in FIGURE 1.

One of the essential components of this invention is the switching device for controlling the application of power to the load. A controlled silicon rectifier was recently introduced to the industry and is admirably suited for this purpose. The controlled rectifier is illustrated in FIGURES 1 and 2, and comprises three p-n junctions or four zones of p-n-p-n conductivities or vice versa. The rectifier, shown generally at 1, comprises an input electrode or emitter electrode 2, an output or collector electrode 3 connected, respectively, to the opposite ends of the silicon body, and a gate or control electrode 4 connected to the intermediate p or n zone. The electrical symbol for this rectifier is shown by FIGURE 2.

The operating characteristics of the controlled silicon rectifier are such that the rectifier may be rendered conducting either by the application of a sufficient potential across the emitter and collector electrodes 2, 3, or by a potential, which in itself is insufficient to cause conduction, but in conjunction therewith, a current of sufficient amplitude applied to the gate electrode 4. The current applied to the gate electrode 4 must, of course, be in the conducting direction. The symbol shown in FIGURE 2 is used in the circuit diagram of the remaining figures.

In power control applications, the rectifier 1 is connected in series with a load 5 and a source of alternating-current power 6, as shown.

Figure 3:
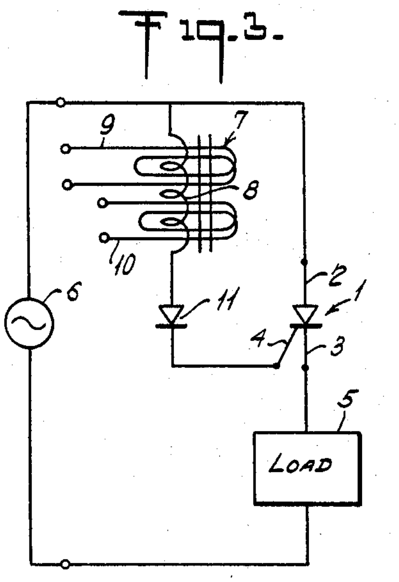
FIGURE 3 is a schematic diagram of one embodiment of the invention.

Referring now to the first embodiment of the invention illustrated in FIGURE 3, the rectifier 1 is normally cut off and the voltage produced by the alternating current source 6 is insufficient to cause the rectifier 1 to conduct. In effect, therefore, the rectifier 1 serves as a switch, and in its non-conducting condition the rectifier "blocks" the application of power to the load 5. The rectifier is selectively rendered conducting by means of a current generator which comprises a magnetic amplifier shown diagrammatically at 7.

The magnetic amplifier 7 comprises a main winding 8 and a pair of control windings 9 and 10. The magnetic amplifier also includes a rectifier 11, which conventionally provides rectified feed-back current for efficient operation of the magnetic amplifier. At the same time this diode acts to prevent damaging negative voltage from appearing at the gate. The control winding 9 may be used to apply direct-current, for biasing the magnetic amplifier to cut-off. In this condition no current is produced by the magnetic amplifier, and the condition of the rectifier 1 remains unaltered. When it is desired to connect the power source to the load, a control signal is applied over winding 10 in a direction to nullify the effect of the biasing current applied to the winding 9. The magnetic amplifier thereupon immediately conducts current, and the amplitude which it is capable of producing is sufficient to cause the rectifier 1 to conduct early in the cycle of the applied current.

Figure 6:
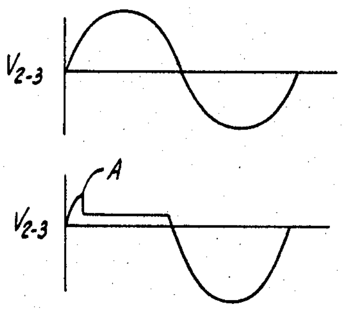
FIGURE 6 are voltage curves across the controlled rectifier in the embodiment of FIGURE 3.

The operation of the circuit is illustrated by the voltage curves shown in FIGURE 6, which appear across the rectifier 1. The upper curve illustrates the voltage wave-form across the rectifier 1 when it is non-conducting. In the lower curve the voltage across the rectifier 1 is shown as building-up until the current applied to the control electrode 4 causes the rectifier to conduct; this occurs at point A. Upon the rectifier 1 becoming conducting, the voltage thereacross immediately drops to a value equal to the I-R drop across the rectifier, which is relatively small. Also, upon the rectifier becoming conducting, the magnetic field developed by the magnetic amplifier immediately collapses, so that no further building-up occurs until the cycle terminates. Because the magnetic field collapses upon conduction of the rectifier 1, there is no necessity to protect the p-n junction between the gate electrode 4 and the output electrode 3. In effect, this circuit contains an inherent or "built-in" safety feature. Further, since the magnetic amplifier is required to carry only sufficient current to cause the rectifier to conduct, the rating is correspondingly reduced, which permits the use of a smaller and lighter magnetic amplifier.

It may be seen from an analysis of FIGURE 1 that the switching time is very short because upon the magnetic amplifier becoming conducting, the current into the gate electrode 4 is limited only by the winding resistance of the magnetic amplifier. The gate current, therefore, is in the form of a sharp pulse of an amplitude sufficient only to cause the rectifier 1 to conduct and the average current through the winding 8 is very low.

Figure 4:
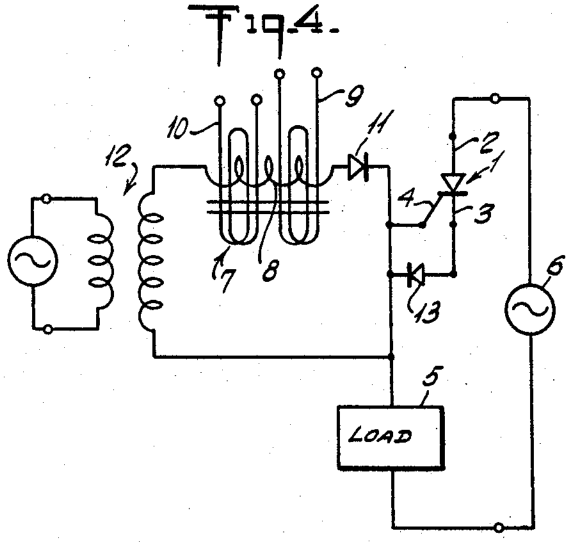
FIGURE 4 is a schematic diagram of another embodiment of the invention.

An alternative embodiment of the invention is illustrated in FIGURE 4. In this embodiment the magnetic amplifier is fed via a transformer 12, and the magnetic field of the amplifier 7 is not collapsed by the conduction of the rectifier 1. The secondary of the transformer 12 is serially connected with the magnetic amplifier, the control electrode and the output electrode. Since there is no inherent safety feature in this circuit, because of the independent energization of the magnetic amplifier 7, a Zener diode 13 is connected across the gate and output electrodes 3, 4, as shown. The Zener diode has an effective zero impedance in its reverse characteristic. Its zero impedance should, therefore, be selected to occur at the level at which it is desired to limit the voltage to the gate electrode. Thus, when the voltage exceeds this limit, the Zener diode acts as a short circuit across the p-n junction.

Figure 7:
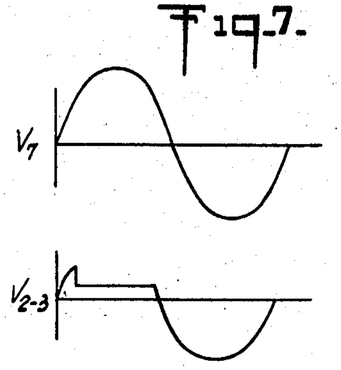
FIGURE 7 are voltage curves across the magnetic amplifier and rectifier in the embodiment of FIGURE 4.

In FIGURE 7 the upper curve is an illustration of the voltage across the magnetic amplifier 7. In the lower curve it is seen that when the voltage attains a value such that sufficient current is produced by the magnetic amplifier 7 to cause the rectifier 1 to conduct, the voltage across the rectifier immediately drops, as described in connection with the embodiment of FIGURE 1. However, irrespective of the voltage drop across the rectifier 1, the voltage across the magnetic amplifier 7 builds up in accordance with the input applied to the transformer 12.

Figure 5:
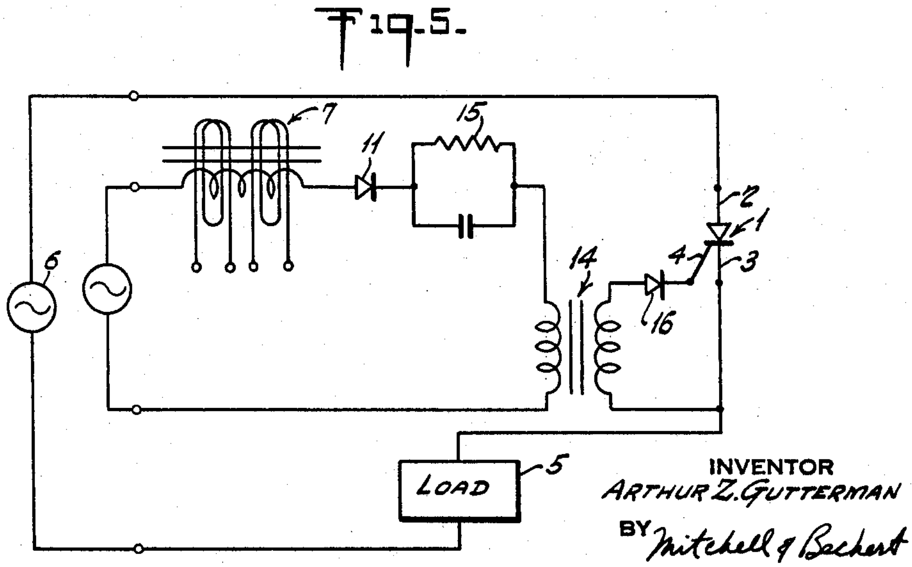
FIGURE 5 is a schematic diagram of still another embodiment of the invention.

A third embodiment of the invention is illustrated in FIGURE 5. In this embodiment the rectifier 1 is caused to conduct by the application of current from an islation transformer 14. The magnetic ampliver 7 is connected in the isolation circuit, that is to the primary of the transformer 14, over a R-C circuit 15. The parameters of the transformer are selected so that a current pulse of just the required amplitude is applied to the control electrode 4. In this embodiment a direction limiting rectifier 16 is connected in the control electrode circuit, for limiting the direction of the applied current to the forward conducting direction, which is required to operate the rectifier 1. If the limiting rectifier 16 were omitted, the negative half of the cycle could possibly damage the rectifier 1.

Figure 8:
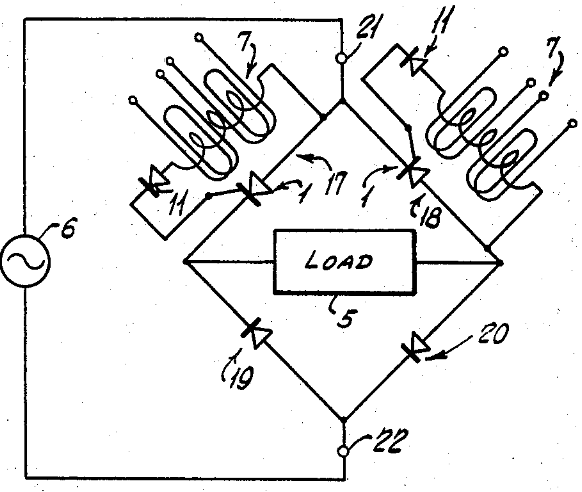
FIGURES 8 and 9 are schematic diagrams of alternating-current bridge circuits utilizing the invention.
Figure 9:
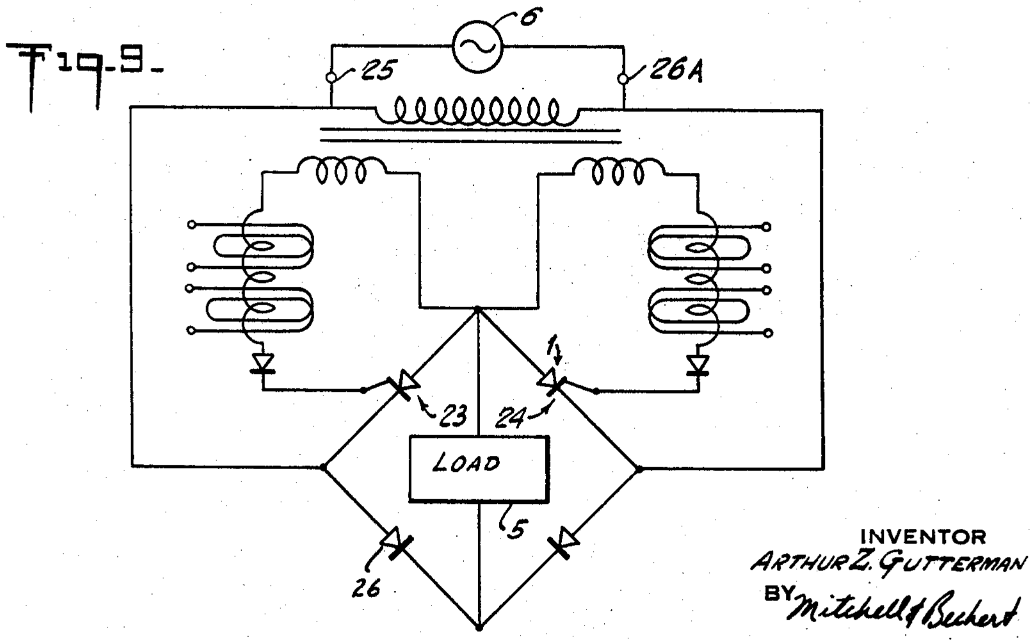

By way of illustration, two applications of the embodiments illustrated in FIGURES 3 and 4 are shown in FIGURES 8 and 9, respectively.

FIGURE 8 shows an alternating-current bridge with the power control circuit of FIGURE 3 connected in two of the arms 17 and 18 of the bridge. The arms 19 and 20 contain ordinary rectifiers. By means of this bridge circuit, power may be applied to the load during both halves of the A-C cycle. For example, when terminal 21 is positive and the arm 17 is conducting, the flow of power is through the rectifier 1 in the arm 17, the load 5, the rectifier 20, terminal 22 and back to the power source 6. During the second half of this cycle, when terminal 22 is positive, the flow of power is through rectifier 19, load 5, rectifier 1 in branch 18, and terminal 21 to the source 6. It was assumed in this example that the branches 17 and 18 had been selectively opened by the application of current to the control electrode.

The operation of FIGURE 3 may be analyzed similarly to that of FIGURE 9, embodying the principles of operation of FIGURE 4. In other words, each of the branch arms 23, 24 comprises the control circuit of FIGURE 4. For example, if terminal 25 were positive, the power flow would be over this terminal through rectifier 26, load 5, rectifier 1 in branch 24, assuming the rectifier is in the conducting condition, terminal 26A and back to the power source 6.

While the foregoing description sets forth the principles of the invention in connection with specific circuits, it is to be clearly understood that this description is made only by way of example and not as a limitation of the scope of the invention as set forth in the objects thereof and in the accompanying claims.

I claim:

1. A power control circuit, comprising a normally blocked rectifier having successive zones of p-n-p-n conductivities, an input electrode connected to an end p zone, an output electrode connected to the opposite end n zone, a control electrode connected to the intermediate p zone, said rectifier being rendered conducting by the application of current of given amplitude and direction to said control electrode, a load coupled to said output electrode, a sourec of power coupled across said rectifier and said load, and a selectively operable magnetic amplifer coupled to said control electrode and capable of producing current of said given amplitude, whereby said rectifier under control of said magnetic amplifier may selectively control the application of power to said load.

2. The circuit according to claim 1, wherein said source of power, said rectifier and said load are serially connected.

3. The circuit according to claim 2, wherein said magnetic amplifier is connected between said control electrode and one terminal of said power source.

4. The circuit according to claim 2, and further comprising transformer means for energizing said magnetic amplifier, the secondary of said transformer means having one terminal connected to said magnetic amplifier and the other terminal connected to said output electrode of said rectifier.

5. The circuit according to claim 2, and further comprising transformer means for applying current to said control electrode, said magnetic amplifier being connected in the primary circuit of said transformer, and the secondary of said transformer being connected between said control electrode and said output electrode, and means in said secondary circuit for limiting the direction of current applied to said control electrode so that the current is applied thereto in the forward conducting direction.

6. A circuit for controlling the application of full-wave power to a load, comprising a bridge circuit, the load being connected across one diagonal of said bridge, a source of alternating current coupled across the other diagonal of said bridge, two adjacent arms of said bridge connected respectively to the opposite terminals of said load, a pair of controlled rectifiers, each having input, output and control electrodes, a magnetic amplifier coupled between the output and control electrodes, each said controlled rectifier being normally in a non-conducting condition, the conduction of said controlled rectifier being initiated by the application of current of given amplitude and direction to said control electrode, said magnetic amplifier being selectively operable to produce said current of given amplitude, the output electrode of one controlled rectifier being connected to the input electrode of the other controlled rectifier, the junction of said electrodes being connected to one terminal of said source of alternating-current, each of the other two arms of said bridge comprising a rectifier having input and output electrodes, the output electrode of one of said rectifiers being connected to the input electrode of the other of said rectifiers, the junction of said electrodes being connected to the other terminal of said alternating-current source, whereby application of full-wave power may be obtained.

7. The circuit according to claim 6, and further comprising transformer means for energizing said magnetic amplifiers connected in two arms of said bridge, the primary of said transformer means being connected across said alternating-current source and the secondary of said transformer being divided into two sections, one of said sections applying current to one of said magnetic amplifiers and the other section applying current to the other of said magnetic amplifiers.

References Cited

UNITED STATES PATENTS

| | | | |
|---|---|---|---|
| 2,770,770 | 11/1956 | Lufcy | 321—25 |
| 2,843,818 | 7/1958 | Mintz et al. | 321—25 |

OTHER REFERENCES

"Solid State Thyraton Switches Kilowatts," by R. P. Frenzel and F. W. Gutzwiller, pub. by Electronics (Mar. 28, 1958),pp. 53–55.

"Magnetic-Amplifier Control of Switching Transistors," by H. W. Collins, pub. by Electrical Engineering (September 1956), p. 812.

MILTON O. HIRSHFIELD, *Primary Examiner.*

SAMUEL BERNSTEIN, WARREN E. RAY, *Examiners.*